(12) United States Patent
Lu et al.

(10) Patent No.: US 6,516,036 B1
(45) Date of Patent: Feb. 4, 2003

(54) METHOD AND APPARATUS FOR DECIMATING AN OVERSAMPLED SIGNAL

(75) Inventors: Cheng-Youn Lu, Cresskill, NJ (US); Randall Bret Perlow, Aliso Viejo, CA (US); Charles Reed, Jr., Yardley, PA (US)

(73) Assignees: Sarnoff Corporation, Princeton, NJ (US); Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/461,929

(22) Filed: Dec. 15, 1999

(51) Int. Cl.[7] .............................. H04L 5/12; H04L 27/38
(52) U.S. Cl. ........................................ 375/261; 375/279
(58) Field of Search .................................. 375/261, 279, 375/329, 317, 355

(56) References Cited

U.S. PATENT DOCUMENTS

| | | | | |
|---|---|---|---|---|
| 4,599,732 A | * | 7/1986 | LeFever | 375/13 |
| 5,157,694 A | * | 10/1992 | Iwasaki et al. | 375/81 |
| 6,104,237 A | * | 8/2000 | Mabuchi | 329/307 |
| 6,121,828 A | * | 9/2000 | Sasaki | 329/304 |
| 6,134,279 A | * | 10/2000 | Soichi et al. | 375/341 |

* cited by examiner

Primary Examiner—Don N. Vo
Assistant Examiner—Dung X. Nguyen
(74) Attorney, Agent, or Firm—W. J. Burke

(57) ABSTRACT

Method and apparatus for determining the correct set of samples to retain in applying a decimation process. The present method provides an automatic approach to determine the timing phase of the desired samples to decimate the oversampled input signal (data sequence), thereby producing the underlying data signal.

14 Claims, 5 Drawing Sheets

METHOD AND APPARATUS FOR DECIMATING AN OVERSAMPLED SIGNAL

The present invention relates to an apparatus and concomitant method for signal processing. More particularly, this invention relates to a method and apparatus that determines the desired timing phase to decimate an oversampled input signal, e.g., a QAM signal, to reconstruct the underlying data signal.

BACKGROUND OF THE INVENTION

Power and bandwidth are important resources that are carefully conserved by digital transmission systems through the proper selection of modulation and error correction schemes. Quadrature Amplitude Modulation (QAM) is one form of a multilevel amplitude and phase modulation that is frequently employed in digital communication. QAM modulates a source signal into an output waveform with varying amplitude and phase. The QAM output waveform (QAM signal) can be mapped onto a "constellation diagram" having four quadrants of phasor points. The QAM constellation employs the "I" and "Q" components to signify the in-phase and quadrature components, respectively, where a QAM data word or symbol is represented by both the I and Q components.

Generally, an increase in the number of phasor points (finer constellations) within the QAM constellation will permit a QAM signal to carry more information, but the increase in density of the phasor points creates a disadvantage where the transmitted power is no longer constant. In fact, if the average transmitted signal power is limited, the maximum I and Q values are nearly the same for all the QAM levels, thereby causing the constellation points to be closely spaced as the QAM level increases. Since the distance between phasor points on a QAM constellation generally decreases with additional phasor points, it increases the complexity of distinguishing neighboring phasor points, and translates into a more expensive and complex receiver.

Additionally, it is generally known that a continuous-time signal can be represented by a sequence of its samples that are equally spaced. Namely, the Nyquist theory indicates that at least two samples are necessary per cycle at any frequency (Nyquist rate) in order to analyze it. Therefore, the input signal should be bandlimited to less than half the sampling rate in order to eliminate any frequency component outside the Nyquist limitation.

Thus, a receiver will generally oversample the input signal in order to uniquely reconstruct the underlying data signal. Such oversampled input signal is often then subjected to a conventional two-to-one decimation process, that undersamples the input signal (input data sequence) from two samples per unit time T to one sample per unit time T without discriminating which sample to be selected as the output signal.

In applications where the sample selection issue is not critical, the conventional two-to-one decimator is applicable. However, in some applications, the conventional two-to-one decimator cannot be directly used. Namely, it is very critical in some applications as to which samples are kept and which samples are discarded when the two-to-one decimator is applied to the oversampled input signal.

For example, in QAM demodulation applications, the I and Q symbol sequence, which carries signal information, is embedded in a twice oversampled data sequence. Unless the decimator can selectively determine the correct pair of samples, the data could be incorrectly decimated, thereby resulting in the loss of important information.

Therefore, a need exists in the art for a method and apparatus for determining the correct set of samples to retain in applying a decimation process.

SUMMARY OF THE INVENTION

The present invention is a method and apparatus for determining the correct set of samples to retain in applying a decimation process. Namely, the present invention provides an automatic method of determining the timing phase of the desired samples to decimate the oversampled input signal (data sequence), thereby producing the underlying data signal.

Specifically, an instantaneous power signal is generated for the oversampled input signal. The instantaneous power signal is then decimated using two different timing phases that have the same timing rate. The timing rate of the two different timing phases is suitably selected to be one-half of the timing rate that was applied to sample the input signal. Difference values are then obtained on a sample by sample basis between the two decimated instantaneous power signals, where the difference values are then accumulated in an integrator. The accumulated difference values are compared to two thresholds that dictate and control which timing phase should be used to decimate the oversampled input signal.

The premise of the present invention is that the mean power for the desired samples should be greater than the mean power for the undesired samples. As such, as the sum from the integrator approaches one of the thresholds, the output representative of that threshold will be used to select the proper sampling phase signal. Thus, the present invention can automatically determine the desired timing phase to decimate an oversampled input signal to reconstruct the underlying data signal by evaluating the instantaneous power of the oversampled input signal.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
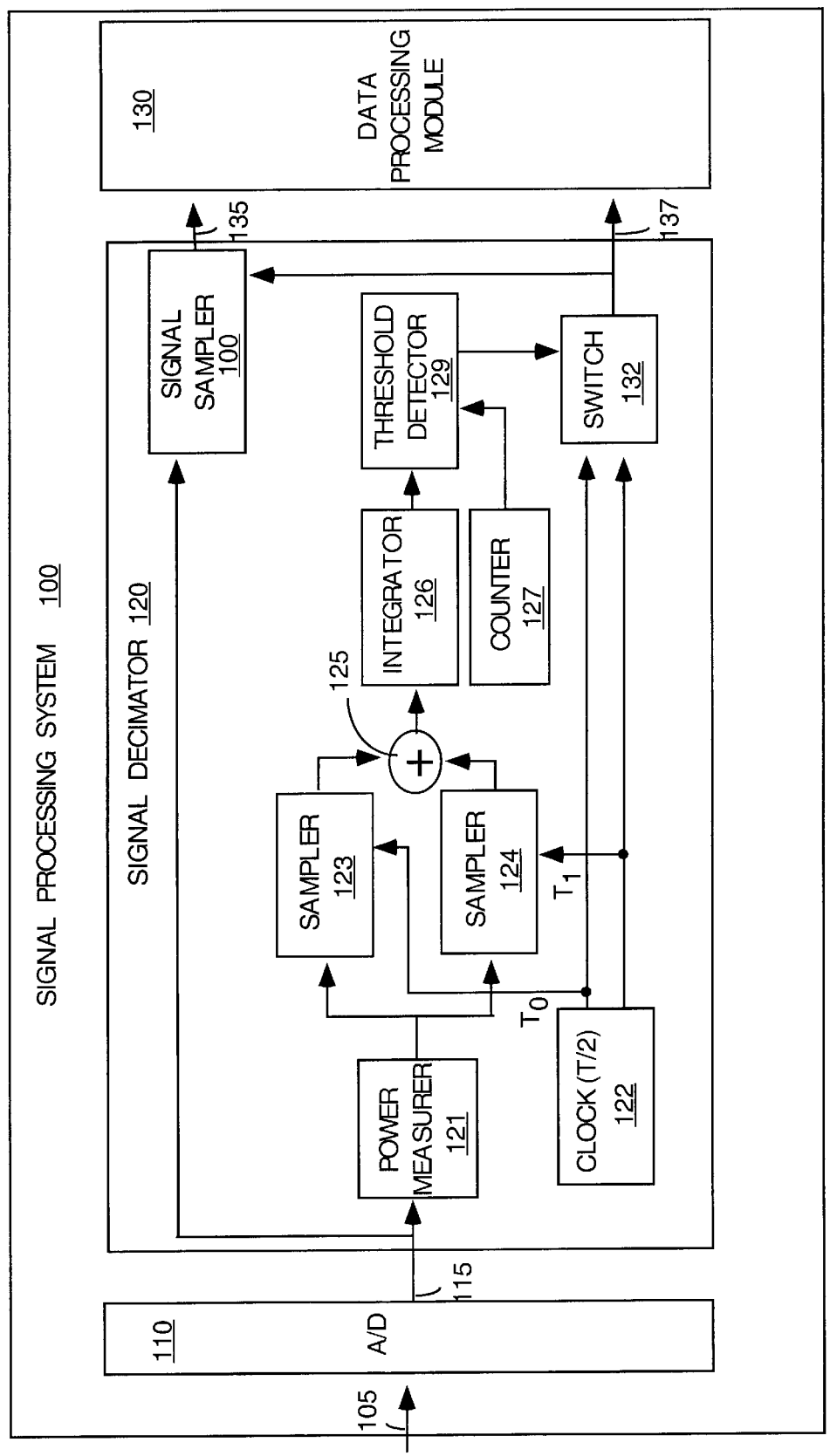
FIG. 1 illustrates a block diagram of a signal processing system of the present invention.

FIG. 1 illustrates a block diagram of a signal processing system 100, e.g., a receiver, that forms one illustrative embodiment of the present invention. The present signal processing system 100 is designed to automatically determine the timing phase of the desired samples from an oversampled input signal (data sequence). The illustrative signal processing system 100 comprises an analog-to-digital (AID) converter 110, a signal decimator 120 and a data processing module 130.

In operation, the analog-to-digital converter 110 receives an input signal, e.g., an M-ary QAM or M-ary Phase Shift Keying (PSK) signal on path 105 and converts the analog signal into digital form. In performing its conversion function, the analog-to-digital converter 110 may oversample the input signal, e.g., at the Nyquist rate or higher, to ensure that the underlying signal can be uniquely reconstructed. However, if the signal is already in digital form, then the analog-to-digital converter 110 can be omitted in the signal processing system 100.

The resulting digitized input signal (impulse-train or data sequence) is passed on path 115 to the signal decimator 120 where the digitized input signal is then decimated to obtain the underlying signal. Namely, the digitized input signal is presumed to be oversampled in accordance with the Nyquist theory. As such, decimation is applied by the signal decimator 120 to reconstruct the underlying signal. In the preferred embodiment of the present invention, the signal decimator determines the proper timing phase signal of the desired samples (underlying signal) from the oversampled input signal. Namely, the oversampled digitized input signal is sampled again using the derived timing phase signal to obtain the underlying signal. Finally, the underlying signal and/or the derived timing phase signal are then forwarded to data processing module 130, where any number of additional signal processing, e.g., decoding, error checking, error recovery, filtering and the like, can be applied to the underlying signal.

More specifically, the signal decimator 120 comprises a power measurer 121, a clock 122, signal samplers 123, 124, and 128, an adder 125, an integrator 126, a counter 127, a threshold detector 129 and a switch 132. In operation, the power for each sample of the oversampled input signal (impulse-train or data sequence) on path 115 is measured. Namely, an instantaneous power signal of the input signal is generated by the power measurer 121. Any number of power measuring functions can be employed in the power measurer 121. For example, a square function, "( )$^2$", or an absolute function, "| |", can be applied to the magnitude of each sample.

The instantaneous power signal is then sampled or decimated by two signal samplers 123 and 124 with different sampling phases. The two different sampling phases are generated by the clock 122. Specifically, the two sampling phases ($T_0$, $T_1$) are derived from a time unit T, where T is a time unit for two samples of the input signal on path 105 and T/2 is the sampling rate, i.e., the Nyquist rate.

Figure 2:
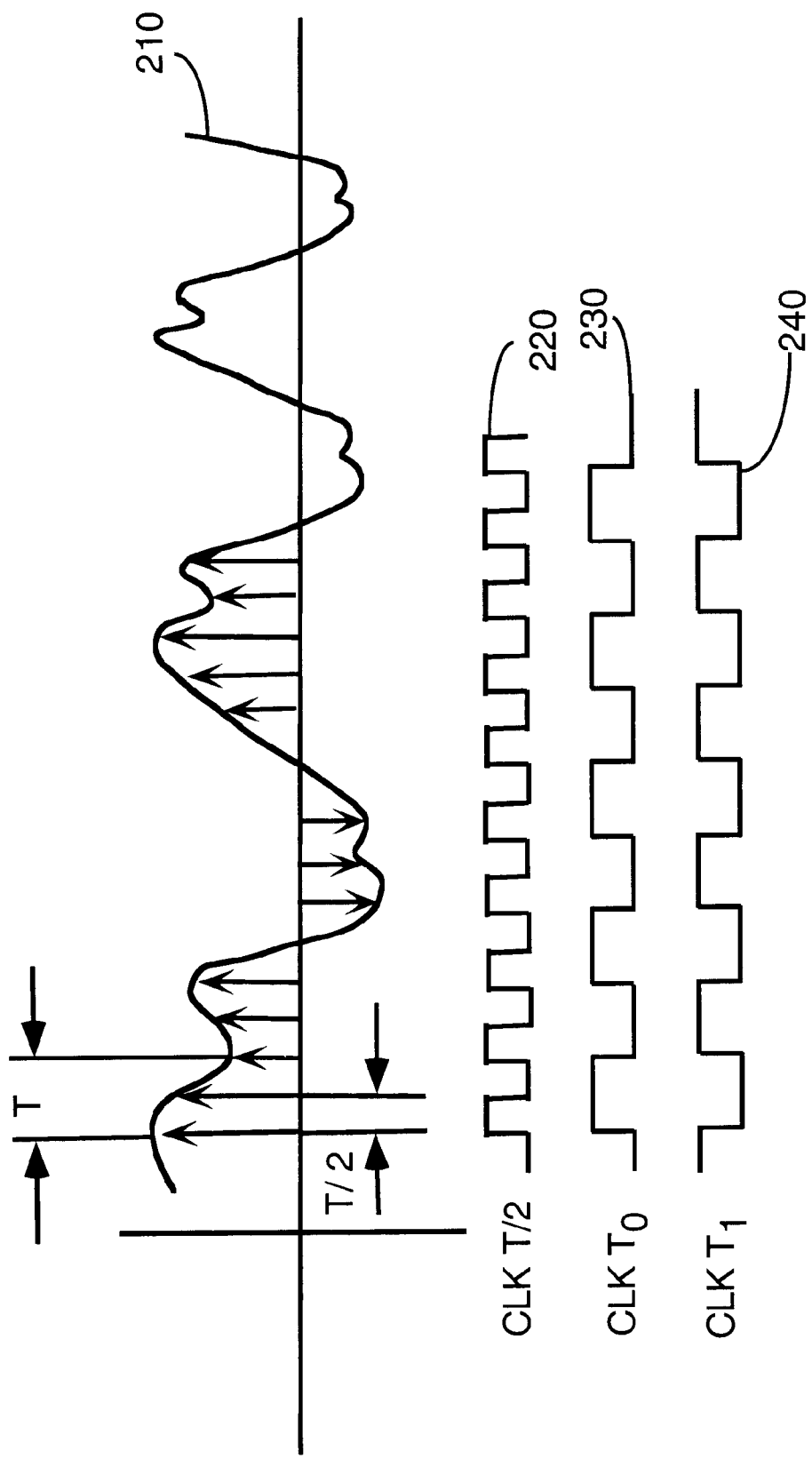
FIG. 2 illustrates an impulse-train sampling of a continuous input signal and the corresponding timing signals.

To illustrate, FIG. 2 shows an illustrative continuous input signal 210 being oversampled by a sampling phase, "CLK T/2", thereby generating an oversampled digitized input signal. For each time unit T, there are two samples, where one of the two samples is a desired sample of the underlying signal. To obtain the desired samples, the oversampled digitized input signal can be decimated or sampled using one of the two sampling phase signals $T_0$, or $T_1$ (230, 240). Namely, $T_0$ and $T_1$ have the same clock rate, but have different phase. The ability to automatically determine the proper sampling phase is an important aspect of the present invention.

Returning to FIG. 1, one signal sampler 123 applies a first sampling phase $T_0$ to sample or decimate the instantaneous power signal of the input signal. Similarly, the other signal sampler 124 applies a second sampling phase $T_1$ to sample or decimate the instantaneous power signal of the input signal. For each sample of the instantaneous power signal from the signal samplers 123 and 124, a difference (or sum) is obtained via subtractor (or adder) 125. Namely, a subtraction operation is applied to the two power levels that are sampled with the same clock rate, but at different clock phases.

The resulting difference power signal is integrated or accumulated by the integrator 126 over a number of samples, e.g., the number of samples within a millisecond time period (0.001 second). Namely, the difference instantaneous power samples are summed.

The sum of the power samples is then compared in the threshold detector 129 against predefined thresholds. For example, the threshold detector 129 may comprise a two-level threshold such that the output of the threshold detector 129 will produce an output "1" if the sum from the integrator 126 is positive or an output "0" otherwise. The premise is that the mean power for the desired samples should be greater than the mean power for the undesired samples. As such, as the sum from the integrator approaches one of the thresholds, the output representative of that threshold will be used to select the proper sampling phase signal.

For example, if the instantaneous power signal from the signal sampler 123 is greater than the instantaneous power signal from the signal sampler 124, then the integrator will produce a positive sum that will approach a positive threshold, thereby indicating that the sampling phase signal T₀ is the proper sampling phase signal to decimate the input signal. Conversely, if the instantaneous power signal from the signal sampler 123 is lower than the instantaneous power signal from the signal sampler 124, then the integrator will produce a negative sum that will approach a negative threshold, thereby indicating that the sampling phase signal T₁ is the proper sampling phase signal to decimate the input signal.

In turn, the output of the threshold detector serves as a control mechanism for the switch 132. Specifically, the output from the threshold detector causes the switch to select one of the two sampling phase signals $T_0$, or $T_1$ (230, 240). It should be noted that the counter 127 is employed to generate a halt control signal after a predefined number of samples have been integrated to freeze the threshold detector output.

The selected sampling phase signal is then applied as the sampling phase signal to the signal sampler 128. Unlike the signal samplers 123 and 124, the signal sampler 128 is receiving the original digitized input signal from path 115. Thus, by applying the proper sampling phase signal, the signal sampler 128 is able to properly decimate the digitized input signal to generate the underlying data signal. Finally, the underlying signal on path 135 and the proper sampling phase signal on path 137 are passed to the data processing module 130 for further processing.

Figure 3:
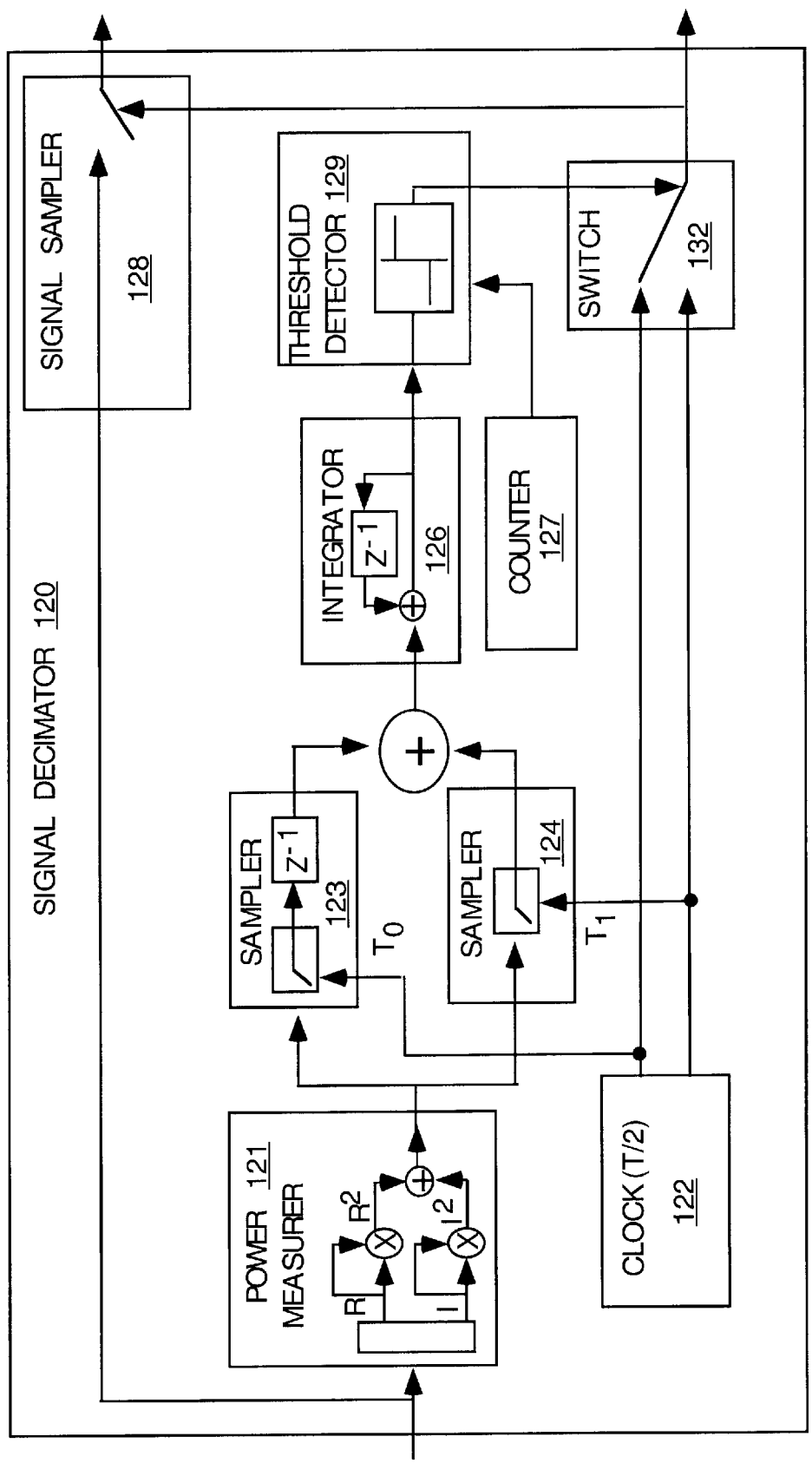
FIG. 3 illustrates a detailed block diagram of a signal decimator of the present invention.

FIG. 3 illustrates a more detailed block diagram of the signal decimator 120 of the present invention. Since the above description is also applicable to FIG. 3, only those components that contain additional information are now described.

The power measurer 121 is illustrated as separating and measuring the real "R" and imaginary "I" components of the oversampled input signal. As such, if a square function is employed, then the real "R" and imaginary "I" components are separately squared first and then summed to produce the instantaneous power signal.

One of the signal samplers 123 and 124, further employs a delay element. Since the instantaneous power samples generated by the two signal samplers 123 and 124 are out of phase, the delay element is necessary to align the samples before applying the difference operation. Although the delay element is illustrated as being deployed in signal sampler 123, those skilled in the art will realize that the delay element can alternatively be deployed in signal sampler 124 instead.

Figure 4:
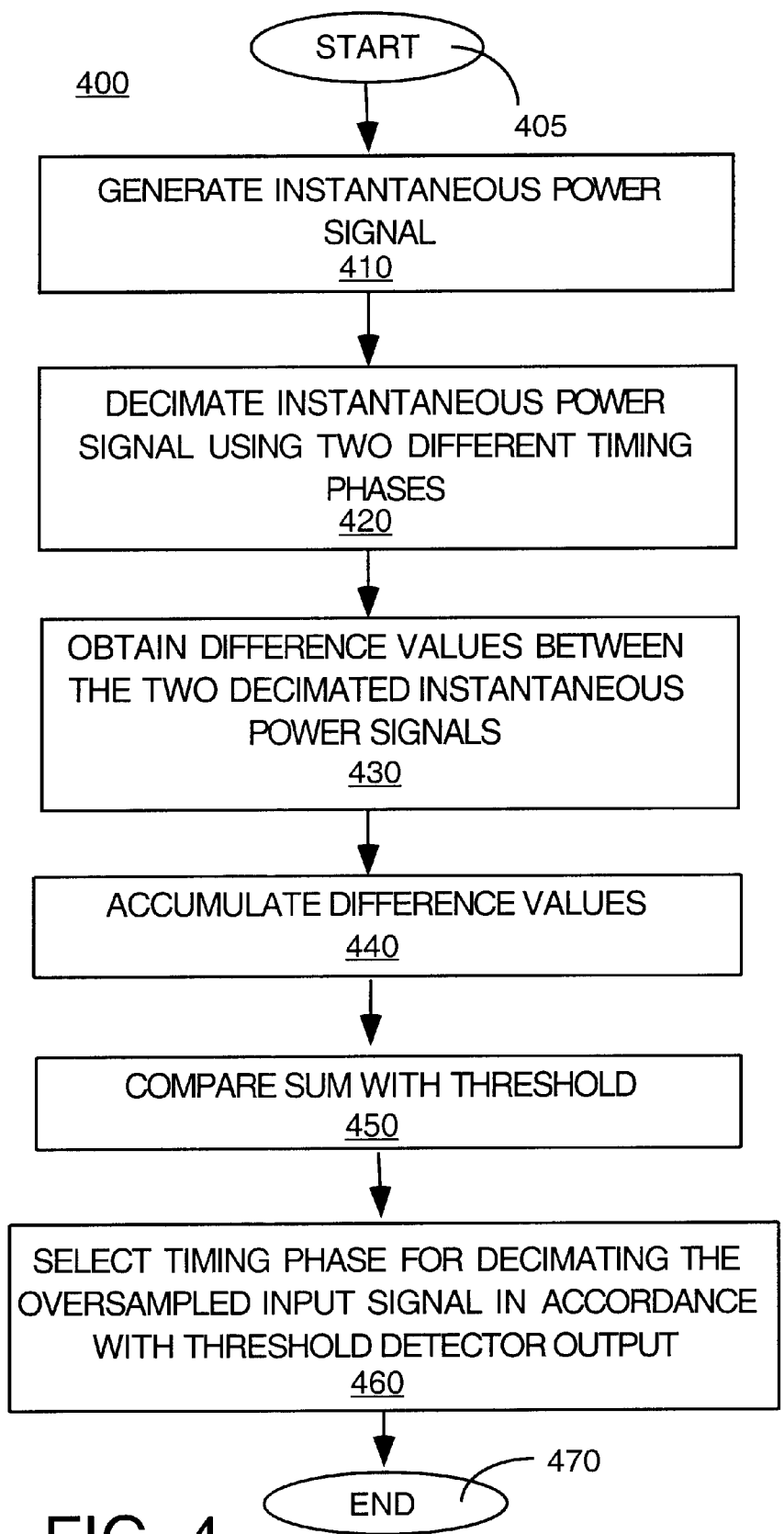
FIG. 4 illustrates a flow chart of a method for determining the timing phase of the desired samples from the oversampled input signal.

FIG. 4 illustrates a flow chart of a method 400 for determining the timing phase (sampling phase signal) of the desired samples from the oversampled input signal. Method 400 starts in step 405 and proceeds to step 410 where method 400 generates an instantaneous power signal from the oversampled input signal. Method 400 may employ a square function or an absolute function to produce the instantaneous power signal.

In step 420, method 400 decimates the instantaneous power signal using two signal samplers that have two different timing phases. The timing rate of the two different timing phases is suitably selected to be one-half of the timing rate that was applied to sample the input signal.

In step 430, method 400 obtains difference values on a sample by sample basis between the two decimated instantaneous power signals, where the difference values are then summed or accumulated in an integrator in step 440.

In step 450, method 400 compares the sum of difference values in a threshold detector. When the sum reaches a predefined threshold, the threshold detector will generate a threshold output that corelates with the associated predefined threshold.

In step 460, method 400 selects a timing phase or sampling phase signal for decimating the oversampled input signal in accordance with the threshold output. Finally, method 400 ends in step 470.

Figure 5:
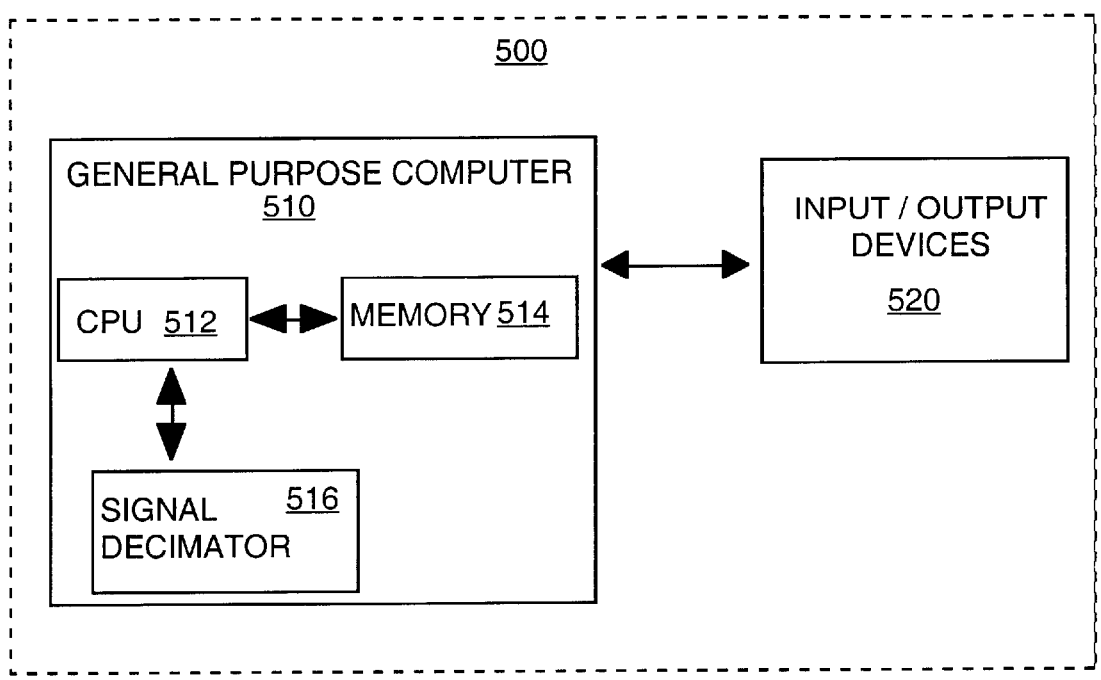
FIG. 5 illustrates a block diagram of a signal processing system of the present invention implemented via a general purpose computer.

FIG. 5 illustrates a block diagram of a signal processing system 500 of the present invention implemented via a general purpose computer. The signal processing system 500 comprises a general purpose computer 510 and various input/output devices 520. The general purpose computer comprises a central processing unit (CPU) 512, a memory 514 and a signal decimator 516 for selecting a proper timing phase to decimate the oversampled input signal.

In the preferred embodiment, the signal decimator 516 is simply the signal decimator 120 as discussed above in FIG. 1. The signal decimator 516 can be a physical device that is coupled to the CPU 512 through a communication channel. Alternatively, the signal decimator 516 can be represented by a software application (or a combination of software and hardware, e.g., using application specific integrated circuits (ASIC)), where the software is loaded from a storage medium, (e.g., a magnetic or optical drive or diskette) and operated by the CPU in the memory 514 of the computer. As such, the signal decimator 516 and various methods of the present invention can be stored on a computer readable medium. Furthermore, various data structures generated by the signal decimator 516, e.g., instantaneous power signal, decimated instantaneous power signals of different phases, various sums, predefined counter value and predefined thresholds, can also be stored on a computer readable medium, e.g., RAM memory, magnetic or optical drive or diskette and the like.

The computer 510 can be coupled to a plurality of input and output devices 520, such as a keyboard, a mouse, an audio recorder, a camera, a camcorder, a video monitor, any number of imaging devices or storage devices, including but not limited to, a tape drive, a floppy drive, a hard disk drive or a compact disk drive.

Although various embodiments which incorporate the teachings of the present invention have been shown and described in detail herein, those skilled in the art can readily devise many other varied embodiments that still incorporate these teachings.

What is claimed is:

1. A method for determining a sampling phase signal for decimating an oversampled input signal, said method comprising the steps of:

(a) generating an instantaneous power signal of the oversampled input signal;

(b) decimating said instantaneous power signal using two different sampling phase signals to generate two decimated instantaneous power signals;

(c) generating a plurality of difference values between said two decimated instantaneous power signals;

(d) comparing an accumulation of said plurality of difference values with a threshold to produce a threshold output; and (e) selecting one of said two different sampling phase signals for decimating the oversampled input signal in accordance with said threshold output.

2. The method of claim 1, wherein said decimating step (b) decimates said instantaneous power signal using two different sampling phase signals that have a timing rate that is approximately one-half of a timing rate that was applied to obtain the oversampled input signal.

3. The method of claim 1, wherein the oversampled input signal is a Quadrature Amplitude Modulation (QAM) signal.

4. The method of claim 1, wherein the oversampled input signal is a Phase Shift Keying (PSK) signal.

5. An apparatus for determining a sampling phase signal for decimating an oversampled input signal, said apparatus comprising:

a power measurer for generating an instantaneous power signal of the oversampled input signal;

a first signal sampler for decimating said instantaneous power signal using a first sampling phase signal to generate a first decimated instantaneous power signal;

a second signal sampler for decimating said instantaneous power signal using a second sampling phase signal to generate a second decimated instantaneous power signal;

means for generating a plurality of difference values between said first and said second decimated instantaneous power signals;

a threshold detector for comparing an accumulation of said plurality of difference values with a threshold to produce a threshold output; and a switch for selecting one of said first and said second sampling phase signals for decimating the oversampled input signal in accordance with said threshold output.

6. The apparatus of claim 5, wherein each of said first and said second sampling phase signals has a timing rate that is approximately one-half of a timing rate that was applied to obtain the oversampled input signal.

7. The apparatus of claim 5, wherein the oversampled input signal is a Quadrature Amplitude Modulation (QAM) signal.

8. The apparatus of claim 5, wherein the oversampled input signal is a Phase Shift Keying (PSK) signal.

9. The apparatus of claim 5, wherein said means for generating said plurality of difference values is an adder.

10. The apparatus of claim 5, wherein said means for generating said plurality of difference values is a subtractor.

11. A computer-readable medium having stored thereon a plurality of instructions, the plurality of instructions including instructions which, when executed by a processor, cause the processor to perform the steps comprising of:

(a) generating an instantaneous power signal of an oversampled input signal;

(b) decimating said instantaneous power signal using two different sampling phase signals to generate two decimated instantaneous power signals;

(c) generating a plurality of difference values between said two decimated instantaneous power signals;

(d) comparing an accumulation of said plurality of difference values with a threshold to produce a threshold output; and (e) selecting one of said two different sampling phase signals for decimating the oversampled input signal in accordance with said threshold output.

12. The computer-readable medium of claim 11, wherein said decimating step (b) decimates said instantaneous power signal using two different sampling phase signals that have a timing rate that is approximately one-half of a timing rate that was applied to obtain the oversampled input signal.

13. The computer-readable medium of claim 11, wherein the oversampled input signal is a Quadrature Amplitude Modulation (QAM) signal.

14. The computer-readable medium of claim 11, wherein the oversampled input signal is a Phase Shift Keying (PSK) signal.

* * * * *